(12) United States Patent
Woodruff

(10) Patent No.: US 6,438,711 B2
(45) Date of Patent: *Aug. 20, 2002

(54) METHOD AND APPARATUS FOR PERFORMING FIELD DIAGNOSTICS ON A COMPUTER SYSTEM

(75) Inventor: Robert J. Woodruff, Bank, OR (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/116,310

(22) Filed: Jul. 15, 1998

(51) Int. Cl.[7] ............................................... H02H 3/05
(52) U.S. Cl. ............................................. 714/27; 713/2
(58) Field of Search ........................ 714/27, 31; 713/2; 707/10; 709/224

(56) References Cited

U.S. PATENT DOCUMENTS

| | | | | |
|---|---|---|---|---|
| 5,276,863 A | * | 1/1994 | Heider | 709/222 |
| 5,678,002 A | * | 10/1997 | Fawcett et al. | 345/336 |
| 6,000,040 A | * | 12/1999 | Culley et al. | 714/31 |
| 6,101,617 A | * | 8/2000 | Burckhartt et al. | 714/23 |

* cited by examiner

Primary Examiner—Robert Beausoleil
Assistant Examiner—Rita Ziemer
(74) Attorney, Agent, or Firm—Blakely, Sokoloff, Taylor & Zafman LLP

(57) ABSTRACT

A method for managing a computer system includes initiating a reset of the computer system from a remote location. Diagnostic software on the computer system is downloaded from the remote location.

21 Claims, 7 Drawing Sheets

METHOD AND APPARATUS FOR PERFORMING FIELD DIAGNOSTICS ON A COMPUTER SYSTEM

FIELD OF THE INVENTION

The present invention relates to the field of computer systems. More specifically, the present invention relates to a method and apparatus for performing field diagnostics on computer system.

BACKGROUND OF THE INVENTION

Diagnostic software such as AMIDiag by American Megatrends, Inc. and QAPlus® by DiagSoft, Inc. provide trouble shooting capabilities for diagnosing problems with server computer systems. AMIDiag and QAPlus perform tests on the server computer systems' memory, CPU, video controller, serial ports, parallel ports, disks, modems chipsets, and other components on the server computer systems.

Typically, when a server computer system experiences problems, a service technician is dispatched to the site of the server computer system to perform diagnostics on the server computer system. Typically, the service technician is required to reset the server computer system and load a diagnostic environment onto the computer system server. The service technician may then run a diagnostic program such as AMIDiag, QAPlus, or other diagnostic program in order to determine the source of the problem. Upon determining the source of the problem, the service technician may be required to obtain a piece of hardware or a software program to repair the server computer system. Thus, the service technician may be required to make more than one visit to the site of the server computer system. The drawback with this approach is that additional delay and costs are incurred when a service technician is required to make multiple visits to the remote location to diagnose and repair the server computer system. Similar problems also exist when desktop computer systems, main frame computer systems, or other computer systems require diagnosis and repair.

SUMMARY OF THE INVENTION

A method for managing a computer system is disclosed. A reset of the computer system is initiated from a remote location. Diagnostic software downloaded from the remote location is run on the computer system.

BRIEF DESCRIPTION OF THE DRAWINGS

The present invention is illustrated by way of example and not by way of limitation in the figures of the accompanying drawings, in which the like references indicate similar elements in and in which.

DETAILED DESCRIPTION

Figure 1:
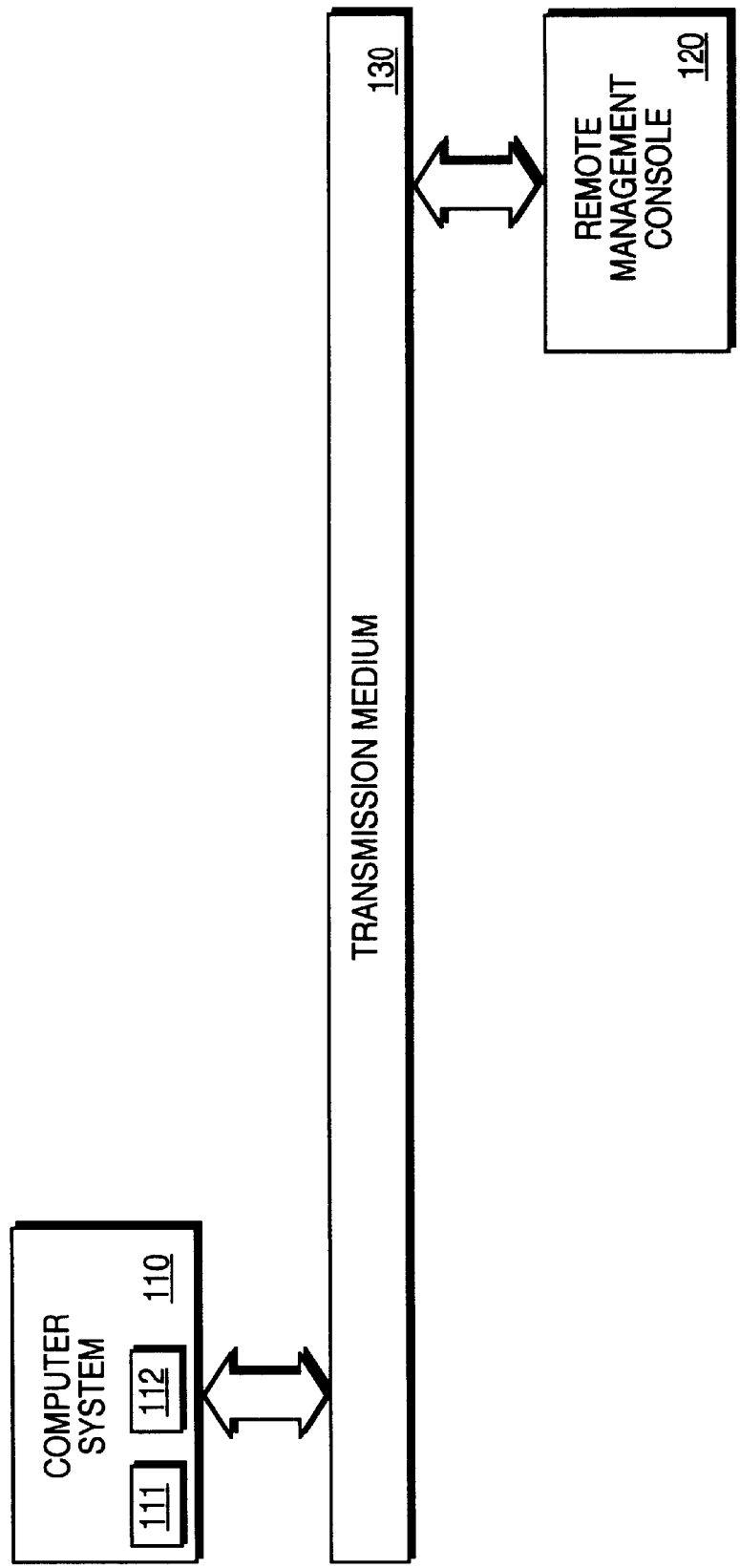
FIG. 1 illustrates a computer system and a remote management console according to an embodiment of the present invention.

FIG. 1 illustrates a computer system 110 and a remote management console 120 according to an embodiment of the present invention. The computer system 110 may be a server computer system, a desktop or a laptop personal computer (PC), a main frame computer system, or other computer system. The remote management console 120 resides in a location that is remote with respect to the computer system 110. The remote management console 120 may be a server computer system, a desktop or laptop PC, a main frame computer system, or other computer system. The remote management console 120 is coupled to the computer system 110 via a transmission medium 130. The computer system 110 and the remote management console 120 transmit data to each other via the transmission medium 130. The transmission medium 130 may be fiber optics, cable, twisted pair, microwave, or other transmission media. The computer system 110 and the remote computer system 120 may be coupled to the transmission medium 130 via a Ethernet connection, a serial connection, a modem connection, or other connection.

According to an embodiment of the present invention, the remote management console 120 is used to perform diagnostics on the computer system 110. The remote management console 120 initiates a remote connection with the computer system 110 via the transmission medium 130. The remote connection may be supported by the computer system 110 via a management module 111. The management module 111 may be, for example, an INTEL Server Monitor Module (SMM). The management module 111 includes a secondary processor (not shown) and a communications interface (not shown) that may be used to interface a remote computer system such as the remote management console 120 without the assistance of other components in the computer system 110. The management module 111 may be used to provide support for the computer system 110 when components in or around the computer system 110 experience failure. For example, the management module 111 may support out of band access for use when the operating system is not functional or when a network connected to a network controller on the computer system 110 is down, remote control of the operating system, system shutdown, and access to system state information to aid in problem diagnosis. According to an embodiment of the present invention, the management module 111 may be used to connect to the remote management console 120 via an Ethernet connection, modem connection, or other connection. The remote management console 120 may initiate a connection with the computer system 110 via a serial interface 112. The serial interface 112 may be used as a communications interface to directly connect the remote management console 120 with the computer system 110 or indirectly connect the remote management console 120 with the computer system 110 via a modem (not shown).

The remote management console 120 sends a signal to a shutdown agent on the computer system 110 to initiate a shutdown and reset of the computer system 110. By resetting the computer system 110, the computer system will execute its Basic Input Output System (BIOS) code. The BIOS code includes a boot strap loader. When executed, the boot strap loader puts the computer system 110 in a diagnostic state. The bootstrap loader recognizes when a connection from the remote management console 120 has been established. The boot strap loader may be used to authorize a diagnostic session request from the remote management console 120, provide the remote management console 120 with information about the computer system 110, and provide support in downloading diagnostic software code from the remote management console 120 directly into a memory in the computer system 110. The diagnostic software code may be executed by a processor (not shown) in the computer system 110 to generate a diagnostic report of the condition of the computer system 110 to the remote management console 120.

Figure 2:
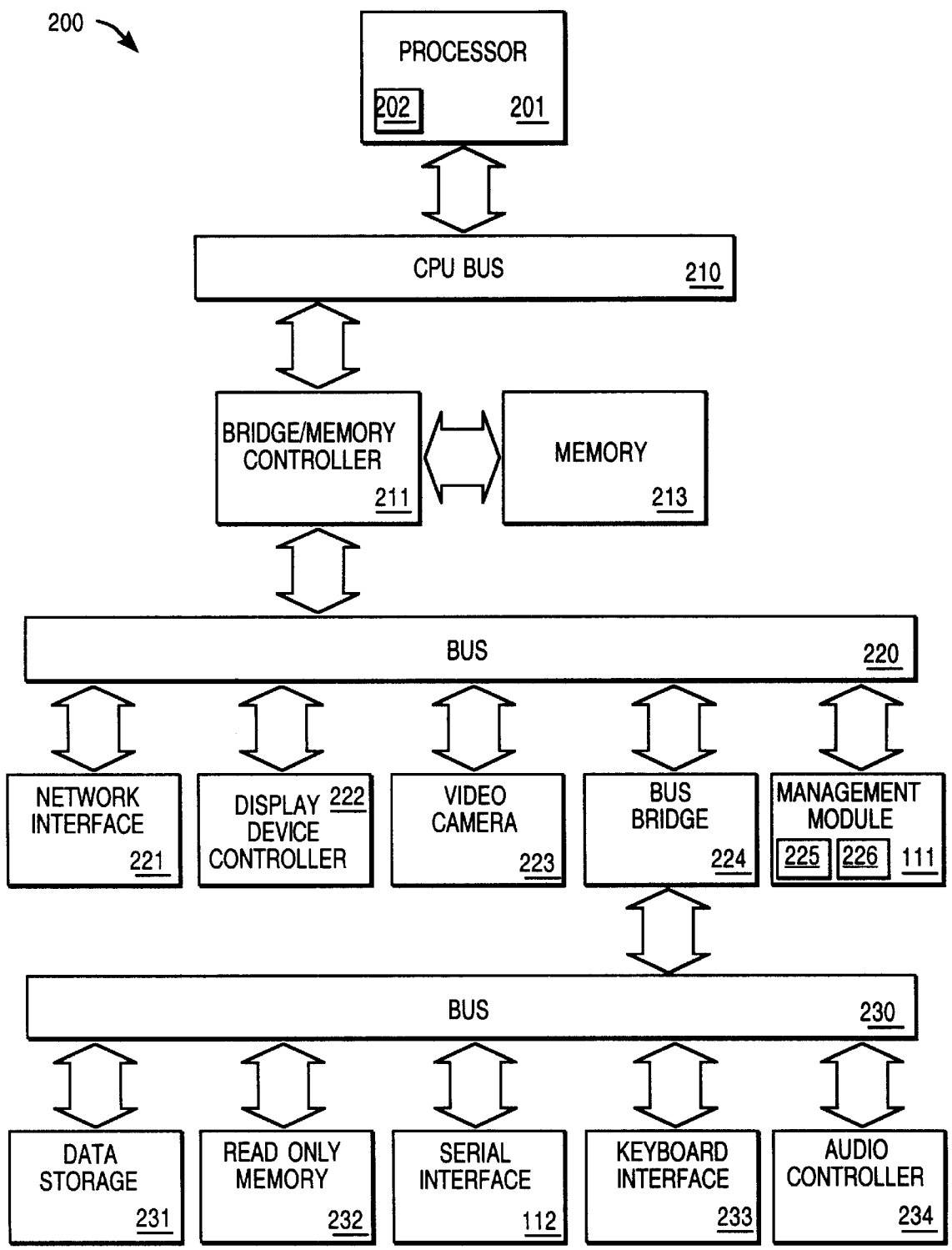
FIG. 2 illustrates a block diagram of a computer system implementing an embodiment of the present invention.

FIG. 2 illustrates a block diagram of a computer system 200 that may be implemented as the computer system 110 (shown in FIG. 1) or the remote management console 120 (shown in FIG. 1). The computer system 200 includes a processor 201 that processes data signals. The processor 201 may be a complex instruction set computer (CISC) microprocessor, a reduced instruction set computing (RISC) microprocessor, a very long instruction word (VLIW) microprocessor, a processor implementing a combination of instruction sets, or other processor device. FIG. 2 shows an example of the present invention implemented on a single processor computer system 200. However, it is understood that the present invention may be implemented in a computer system having multiple processors. The processor 201 is coupled to a CPU bus 210 that transmits data signals between processor 201 and other components in the computer system 200.

The computer system 200 includes a memory 213. The memory 213 may be a dynamic random access memory (DRAM) device, a static random access memory (SRAM) device, or other memory device. The memory 213 may store instructions and code represented by data signals that may be executed by the processor 201. A cache memory 202 may reside inside the processor 201 to store data signals stored in the memory 213. The cache 202 speeds up memory accesses by the processor 201 by taking advantage of its locality of access. In an alternate embodiment of the computer system 200, the cache 202 resides external to the processor 201.

A bridge memory controller 211 may be coupled to the CPU bus 210 and the memory 213. The bridge memory controller 211 directs data signals between the processor 201, the memory 213, and other components in the computer system 200 and bridges the data signals between the CPU bus 210, the memory 213, and a first I/O bus 220.

The first I/O bus 220 may be a single bus or a combination of multiple buses. As an example, the first I/O bus 220 may comprise a Peripheral Component Interconnect (PCI) bus, a Personal Computer Memory Card International Association (PCMCIA) bus, a NuBus, or other buses. The first I/O bus 220 provides communication links between components in the computer system 200. A network controller 221 may be coupled to the first I/O bus 220. The network controller 221 links the computer system 200 to a network of computers (not shown in FIG. 2) and supports communication among the machines. A display device controller 222 may be coupled to the first I/O bus 220. The display device controller 222 allows coupling of a display device to the computer system 200 and acts as an interface between the display device and the computer system 200. The display device controller may be a monochrome display adapter (MDA) card, a color graphics adapter (CGA) card, an enhanced graphics adapter (EGA) card, an extended graphics array (XGA) card or other display device controller. The display device may be a television set, a computer monitor, a flat panel display or other display device. The display device receives data signals from the processor 201 through the display device controller 222 and displays the information and data signals to the user of the computer system 200. A video camera 223 may be coupled to the first I/O bus 220. The video camera 220 operates to capture an image of an object. The video camera 223 may be a digital video camera having internal digital video capture hardware that translates the captured image into digital graphical data. The video camera 223 may be an analog video camera having digital video capture hardware external to the video camera 223 for digitizing the captured image.

A management module 111 may be coupled to the first I/O bus 220 in an embodiment of the computer system 200 where the computer system 200 is implemented as the computer system 110. The management module 111 includes a secondary processor 225 that may be used by the remote management console 120 (shown in FIG. 1) as a shutdown agent. The management module 111 includes a communications interface 226 that may be used to interface the remote management console 120 without the assistance of other components in the computer system 200.

A second I/O bus 230 may be a single bus or a combination of multiple buses. As an example, the second I/O bus 230 may comprise a PCI bus, a PCMCIA bus, a NuBus, an Industry Standard Architecture (ISA) bus, or other buses. The second I/O bus 230 provides communication links between components in the computer system 200. A data storage device 231 may be coupled to the second I/O bus 230. The data storage device 231 may be a hard disk drive, a floppy disk drive, a CD-ROM device, a flash memory device or other mass storage device.

A read only memory (ROM) 232 may be coupled to the second I/O bus. The ROM 232 is nonvolatile memory that stores data that is executed by the processor 201. The ROM 232 may be used to store the computer system's BIOS. A BIOS provides the computer system with a basic set of instructions to perform during system boot up. The instructions may include tests as well as directions required to control peripherals on the computer system.

A serial interface 112 may be coupled to the second I/O bus 230 in an embodiment of the computer system 200 where the computer system 200 is implemented as the computer system 110. The serial interface 112 may be used as a general-purpose interface to connect devices including modems, mice, and printers. According to an embodiment of the present invention, the serial interface 112 may be used as a communications interface to directly connect the remote management console 120 with the computer system 200. According to an alternate embodiment of the present invention, the serial interface 112 may be used as a communications interface to connect the remote management console 120 with the computer system 200 via a modem (not shown). A secondary processor (not shown) may be connected between the secondary I/O bus 230 and the serial interface 112 to support the serial interface 112. The secondary processor may be used by the remote management console 120 as a shutdown agent.

A keyboard interface 233 may be coupled to the second I/O bus 230. The keyboard interface 233 may be a keyboard controller or other keyboard interface. The keyboard interface 233 may be a dedicated device or can reside in another device such as a bus controller or other controller. The keyboard interface 233 allows coupling of a keyboard to the computer system 200 and transmits data signals from a keyboard to the computer system 200. An audio controller 234 may be coupled to the second I/O bus 230. The audio controller 234 operates to coordinate the recording and playing of sounds is also coupled to the I/O bus 230. A bus bridge 224 couples the first I/O bus 220 to the second I/O bus 230. The bus bridge 224 operates to buffer and bridge data signals between the first I/O bus 220 and the second I/O bus 230.

Figure 3:
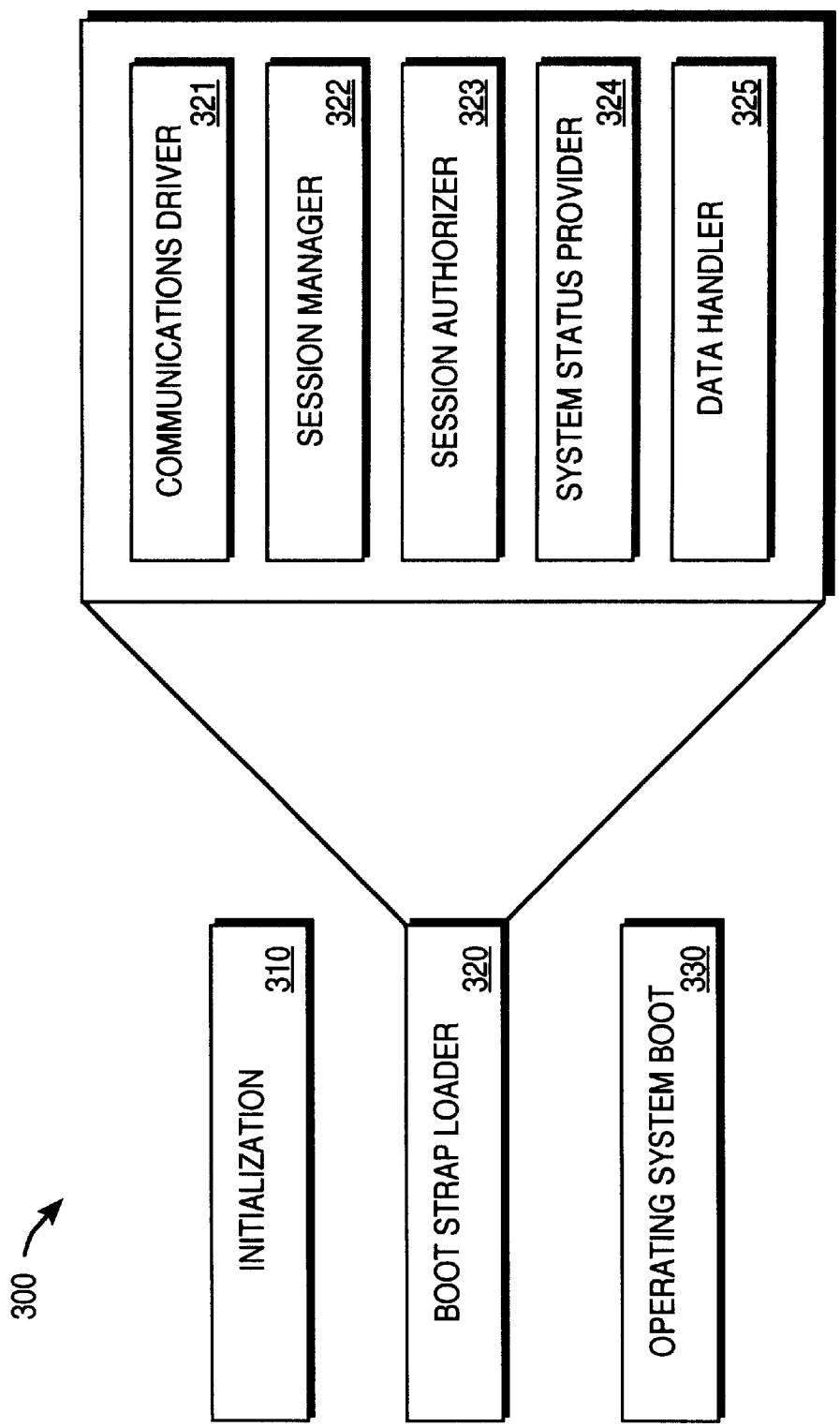
FIG. 3 is a block diagram illustrating the Basic Input Output System (BIOS) according to an embodiment of the present invention.

FIG. 3 is a block diagram illustrating the BIOS 300 stored in the ROM 232 (shown in FIG. 2) of computer system 110 according to an embodiment of the present invention. The BIOS 300 includes a sequence of instructions that are executed by the processor 201 (shown in FIG. 2) to perform a system boot sequence when the computer system 110 is turned on. The sequence of instructions are illustrated as modules in FIG. 3. The BIOS 300 includes an initialization module 310. The initialization module 310 may include a power-on self test (POST). The POST is a diagnostic program that performs a cursory check on the components in the computer system 110. The initialization module 310 may also include programs that initialize peripherals in the computer system 110, that determine the identity of the components on the computer system 110, and that perform tests on specific components in the computer system 110. The initialization module 310 generates an initialization report that describes the results of the tests performed on the computer system 110.

The BIOS 300 includes a boot strap loader module 320 that is executed after the initialization module 310 is executed. The boot strap loader module 320 includes a communications driver 321. The communications driver 321 supports a protocol of communications with the management module 111 (shown in FIGS. 1 and 2) or the serial interface 112 (shown in FIGS. 1 and 2). The communications driver 321 supports a protocol of communications with the management module 111 where data is passed to each other via a shared portion of a memory such as the memory 213 (shown in FIG. 2) in the computer system 110 or other memory. The communications driver 321 may include a serial port driver that supports communications with the serial interface 112.

The boot strap loader module 320 includes a session manager 322. The session manager 322 determines whether the remote management console 120 is requesting a diagnostic session with the computer system 110. According to an embodiment of the present invention, the session manager 322 transmits a query message to the remote computer system 120 via a communications interface 226 (shown in FIG. 2) on the management module 111 or the serial interface 112. The session manager 322 monitors the communications interface 226 on the management module 111 or the serial interface 112 for a diagnostic session request message from the remote management console 120 in response to the query message.

The boot strap loader module 320 includes a session authorizer 323. The session authorizer 323 determines whether the remote management console 120 is authorized to request the diagnostic session. According to an embodiment of the present invention, the remote management console 120 transmits a diagnostic session password with a diagnostic session request message. The session authorizer 323 compares the diagnostic session password received with a stored password to determine whether the remote management console 120 has authorization to request the diagnostic session. If the remote management console 120 has authorization to request the diagnostic session, the session authorizer 323 generates a message stating that a diagnostic session was established successfully. If the remote management console 120 does not have authorization to request the diagnostic session, the session authorizer 323 generates an error message. It should be appreciated that the session authorizer 323 may reside in the management module 225 instead of the boot strap loader 320.

The boot strap loader module 324 includes a system status provider 324. The system status provider 324 provides the remote management console 120 with information about the computer system 110 to allow the remote management console 120 to determine appropriate diagnostics to download onto the computer system 110. The system status provider 324 may provide the remote management console 120 with information about the version of the BIOS 300 in the computer system 110, an initialization report that describes the results of the tests performed by the initialization module 310, or other information. It should be appreciated that the system status provider may reside in the management module 225 instead of the boot strap loader 320.

The boot strap loader module 320 includes a data handler 325. During a diagnostic session, the data handler 325 receives data from the remote management console 120. The data includes diagnostic software code and a location in the memory 213 to write the diagnostic software code. The data handler 325 writes diagnostic software code received into locations in memory as specified by the remote management console 120. A diagnostic environment loader program may be downloaded by the data handler 325 in a situation where a two stage loading process is required. In a two stage loading process, the data handler 325 downloads the diagnostic environment loader which takes control of the downloading. The diagnostic environment loader may include functionalities which allows it to support more complicated loading operations not supported by the data handler 325.

The BIOS includes an operating system boot module 330. The operating system boot module 330 is executed when the session manager 322 determines that no diagnostic session requests are being made. The operating system boot module 330 loads an operating system into the memory 213 of the computer system 110 and runs the operating system.

According to an embodiment of the present invention, the remote management console 120 (shown in FIG. 1) is used to perform field diagnostics on the computer system 110. According to one embodiment, performing field diagnostics on the computer system 110 is performed by the remote management console 120 in response to the processor 201 (shown in FIG. 2) executing sequences of instructions in main memory 213 (shown in FIG. 2). Such instructions may be read into memory 213 from another computer-readable medium, such as data storage device 231 (shown in FIG. 2), or from another source via the network controller 221 (shown in FIG. 2). Execution of the sequences of instructions causes the processor 201 to perform field diagnostics on the computer system 110, as will be described hereafter. In an alternative embodiment, hardwired circuitry may be used in place of or in combination with software instructions to implement the present invention. Thus, the present invention is not limited to any specific combination of hardware circuitry and software.

Figure 4:
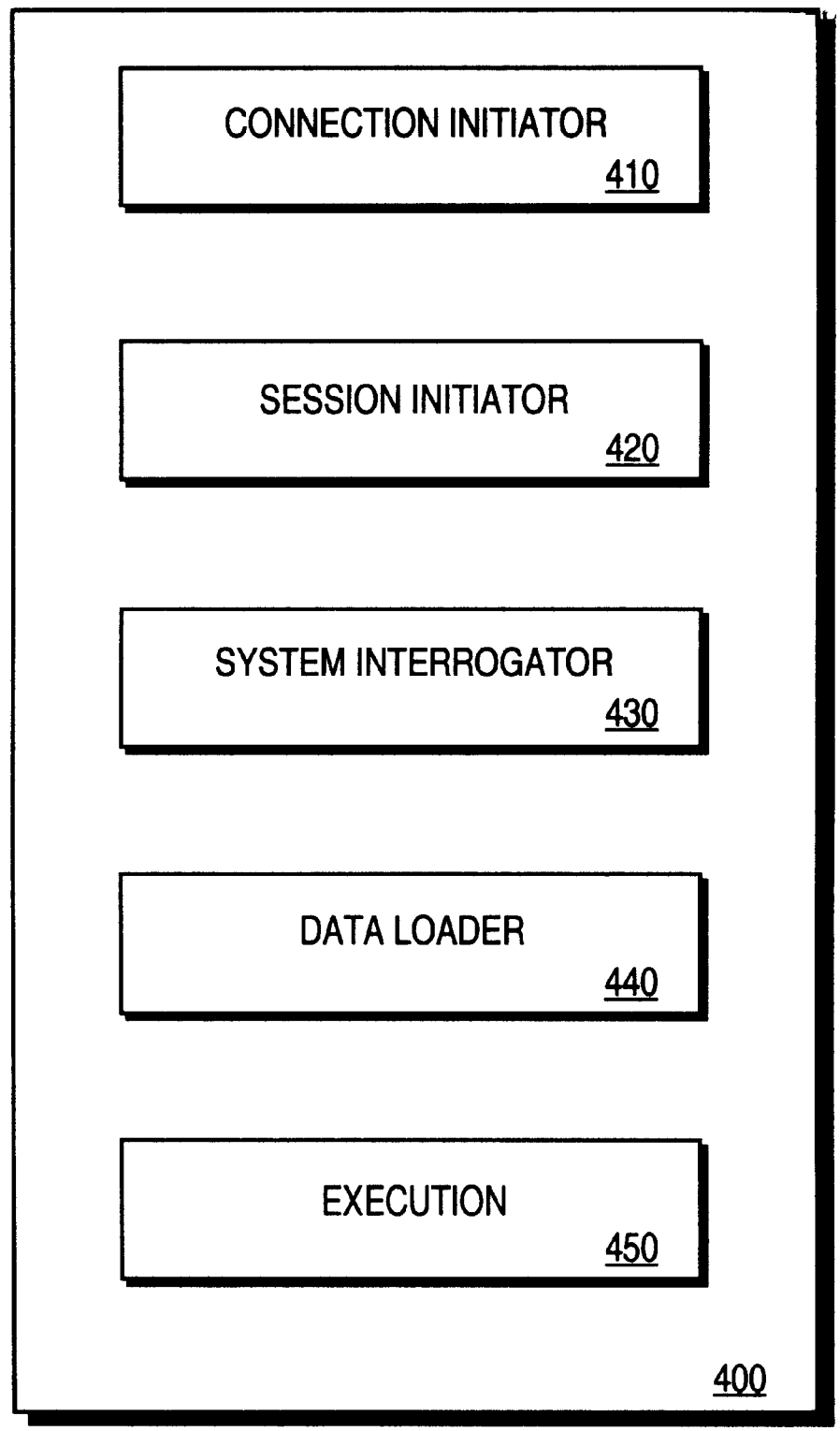
FIG. 4 is a block diagram illustrating a console diagnostic tester according to an embodiment of the present invention.

FIG. 4 is a block diagram of modules implementing a console diagnostic tester 400 according to an embodiment of the present invention. In a preferred embodiment of the present invention, the modules are implemented by software and reside in main memory 213 (shown in FIG. 2) of the remote management console 120 as sequences of instructions. It should be appreciated that the modules may also be implemented by hardware as components coupled to the bus 220 (shown in FIG. 2) of the remote management console 120 (shown in FIG. 1) or a combination of both hardware and software.

The console diagnostic tester 400 includes a connection initiator 410. The connection initiator 410 establishes a connection between the remote management console 120 with the computer system 110. The connection initiator 410 also generates a signal to a shutdown agent on the computer system 110 to initiate a shutdown and reset of the computer system 110. Resetting the computer system 110 executes the bootstrap loader 320 (shown in FIG. 3) in the BIOS 300 (shown in FIG. 3) which places the computer system 110 in a diagnostic state. The console diagnostic tester 400 includes a session initiator 420. Upon receiving a query message from the computer system 110, the console diagnostic tester 400 transmits a diagnostic session request message to the computer system 110. The session initiator 420 may also transmit a diagnostic session password with the diagnostic request message. The diagnostic session password may be used by the computer system 110 to confirm that the remote management console 120 has authorization to request the diagnostic session. The console diagnostic tester 400 includes a system interrogator 430. Upon receiving a message from the computer system 110 that indicates a diagnostic session has been established successfully, the system interrogator 430 interrogates the computer system 110 for information to determine types of diagnostics to download to the computer system 110. The system interrogator 430 may request for example a version of the BIOS on the computer system 110, an initialization report generated by the BIOS of the computer system 110, or other information. The console diagnostic tester 400 includes a data loader 440. The data loader 440 downloads data to the computer system 110. The data loader 440 downloads data that includes diagnostic software code and locations in memory to write the diagnostic software code. The diagnostic software code may include a diagnostic environment loader to assist in downloading additional data, a test run time environment, a test control agent, and diagnostic tests. The console diagnostic tester 400 includes an execution unit 450 that runs the diagnostic software downloaded on the computer system 110.

According to an embodiment of the present invention, the computer system 110 is used by the remote management console 120 to perform field diagnostics on the computer system 110. According to one embodiment, field diagnostics is performed on the computer system 110 in response to the processor 201 (shown in FIG. 2) executing sequences of instructions in main memory 213 (shown in FIG. 2). Such instructions may be read into memory 213 from another computer-readable medium, such as data storage device 231 (shown in FIG. 2), or from another source via the network controller 221 (shown in FIG. 2). Execution of the sequences of instructions causes the processor 201 to perform diagnostics on the computer system 110, as will be described hereafter. In an alternative embodiment, hard-wired circuitry may be used in place of or in combination with software instructions to implement the present invention. Thus, the present invention is not limited to any specific combination of hardware circuitry and software.

Figure 5:
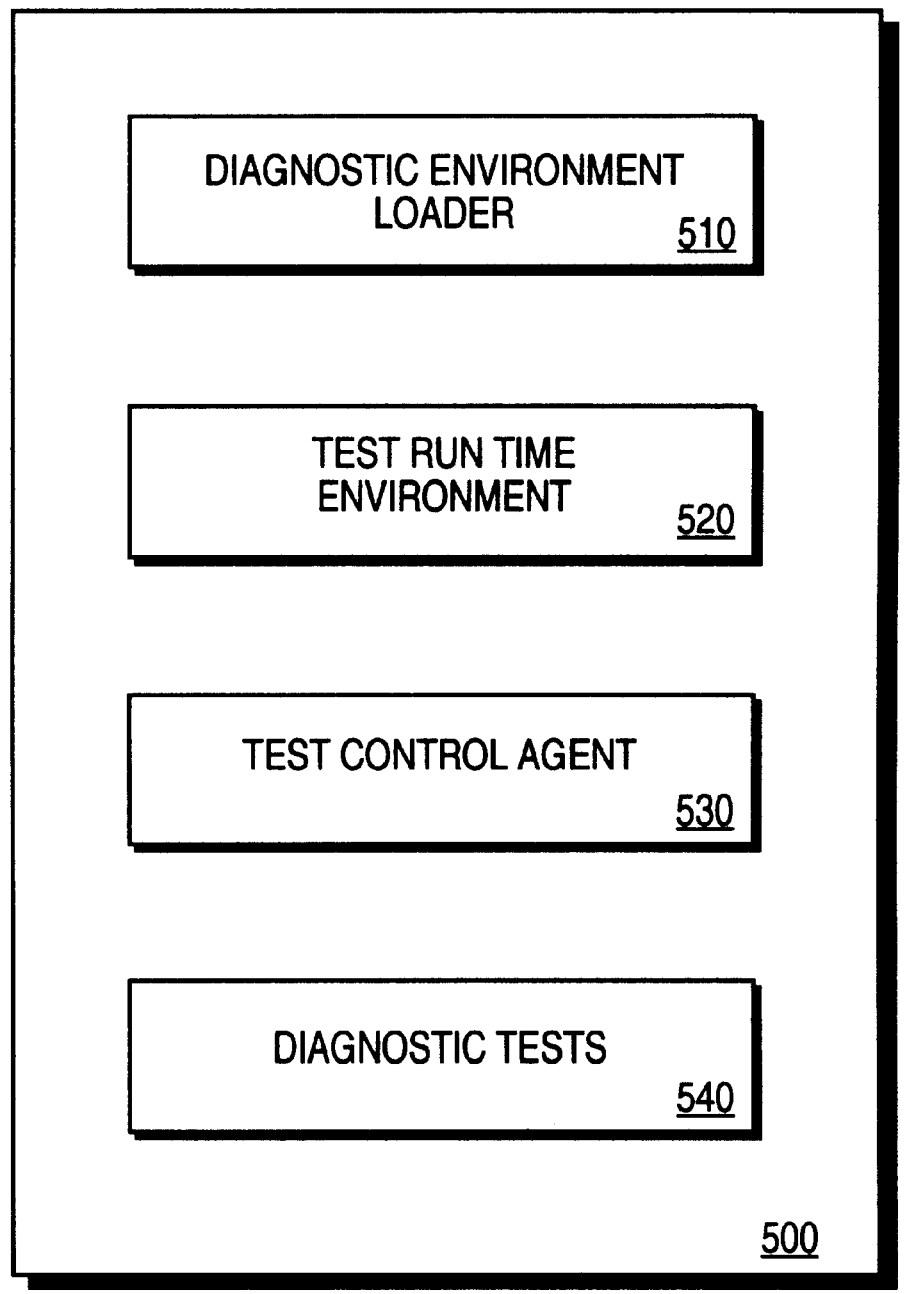
FIG. 5 is a block diagram illustrating a system diagnostic tester according to an embodiment of the present invention.

FIG. 5 is a block diagram of modules implementing a system diagnostic tester 500 according to an embodiment of the present invention. In a preferred embodiment of the present invention, the modules are implemented by software and reside in main memory 213 (shown in FIG. 2) of the computer system 110 as sequences of instructions. It should be appreciated that the modules may also be implemented by hardware as components coupled to the bus 220 (shown in FIG. 2) or a combination of both hardware and software.

The system diagnostic tester 500 includes a diagnostic environment loader 510. The diagnostic environment loader 510 may be used to support a two stage loading process where it performs loading operations which a data handler may not support. It should be appreciated that the system diagnostic tester 500 may operate without the diagnostic environment loader 510. The system diagnostic tester 500 includes a test run time environment 520. The test run time environment 520 is a system environment that allows code to be executed. The test run time environment may be for example a Disk Operating System (DOS) or other operating system. The system diagnostic tester 500 includes a test control agent 530. The test control agent 530 is an application running in the test run time environment 520 that operates as a mechanism for the remote computer system 120 (shown in FIG. 1) to determine which diagnostic tests to execute and obtain the results of the diagnostic tests. The test control agent 530 allows the remote management console 120 to manages diagnostic testing on the computer system 110. The system diagnostic tester 500 also includes diagnostic tests 540 that have been downloaded from the remote management console.

The present invention allows the remote downloading and execution of diagnostic test programs 540 onto the computer system 110 without any local user intervention. The present invention does not require a peripheral drive such as a hard drive, floppy drive, or CDROM drive to be functional on the computer system 110 to support the diagnostic session. The test run time environment 520 and diagnostic tests 540 are downloaded to memory 213 rather than run from the computer system peripheral disk drive.

Figure 6:
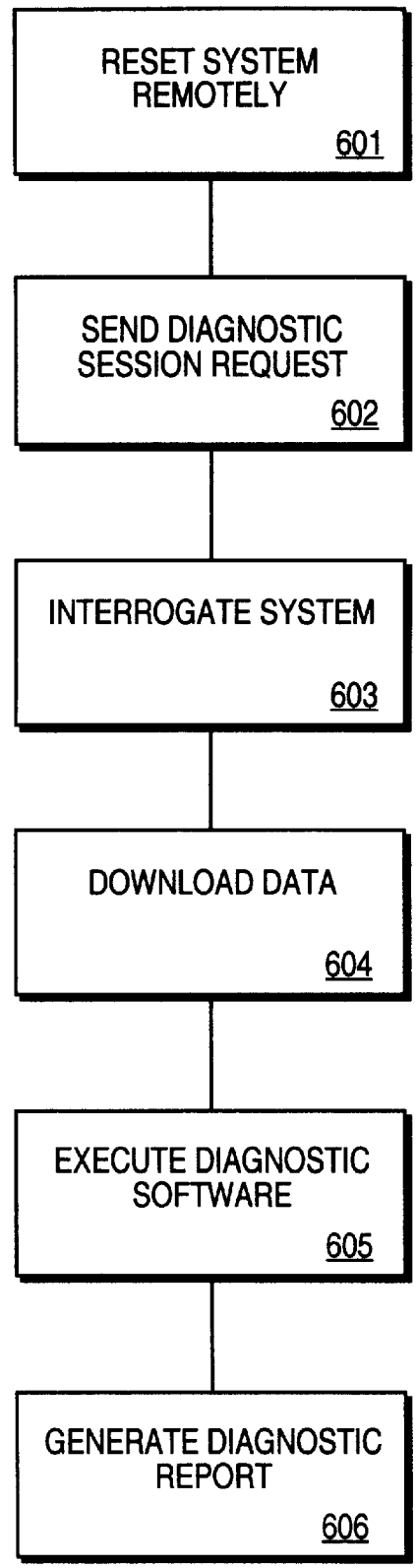
FIG. 6 is a flow chart illustrating a method for managing a computer system according to a first embodiment of the present invention.

FIG. 6 is a flow chart illustrating a method for managing a computer system according to a first embodiment of the present invention. At step 601, the computer system is reset from a remote location. According to an embodiment of the present invention, resetting the computer system from a remote location is achieved by interfacing the computer system via a remote connection and sending a shutdown request to a shutdown agent in the computer system via the remote connection. Interfacing the computer system via a remote connection may be achieved, for example, by interfacing the computer system via an Ethernet connection or a modem connection to a management module connected to the computer system, or interfacing the computer system via a direct connection or modem connection to a serial interface connected to the computer system.

At step 602, a diagnostic session request and a diagnostic session password is transmitted to the computer system via the remote connection.

At step 603, the computer system is interrogated to determine types of diagnostic software to download onto the computer system. According to an embodiment of the present invention, the computer system is interrogated by retrieving BIOS version information, an initialization report, or other information from the computer system. Determining types of diagnostic software to download onto the computer system may be achieved by matching a set of diagnostic tests designed for a specific BIOS version or selecting specific diagnostic tests to run on a component reported as failing a test in the initialization report.

At step 604, data is downloaded onto the computer system. According to an embodiment of the present invention, the data includes diagnostic software code and a location in memory to write the diagnostic software code. The diagnostic software code may include a diagnostic environment loader, test run time environment, test control agent, tests, or other diagnostic software code.

At step 605, the diagnostic software downloaded from the remote location is executed.

At step 606, a diagnostic report generated from the diagnostic software is transmitted to the remote location.

Figure 7:
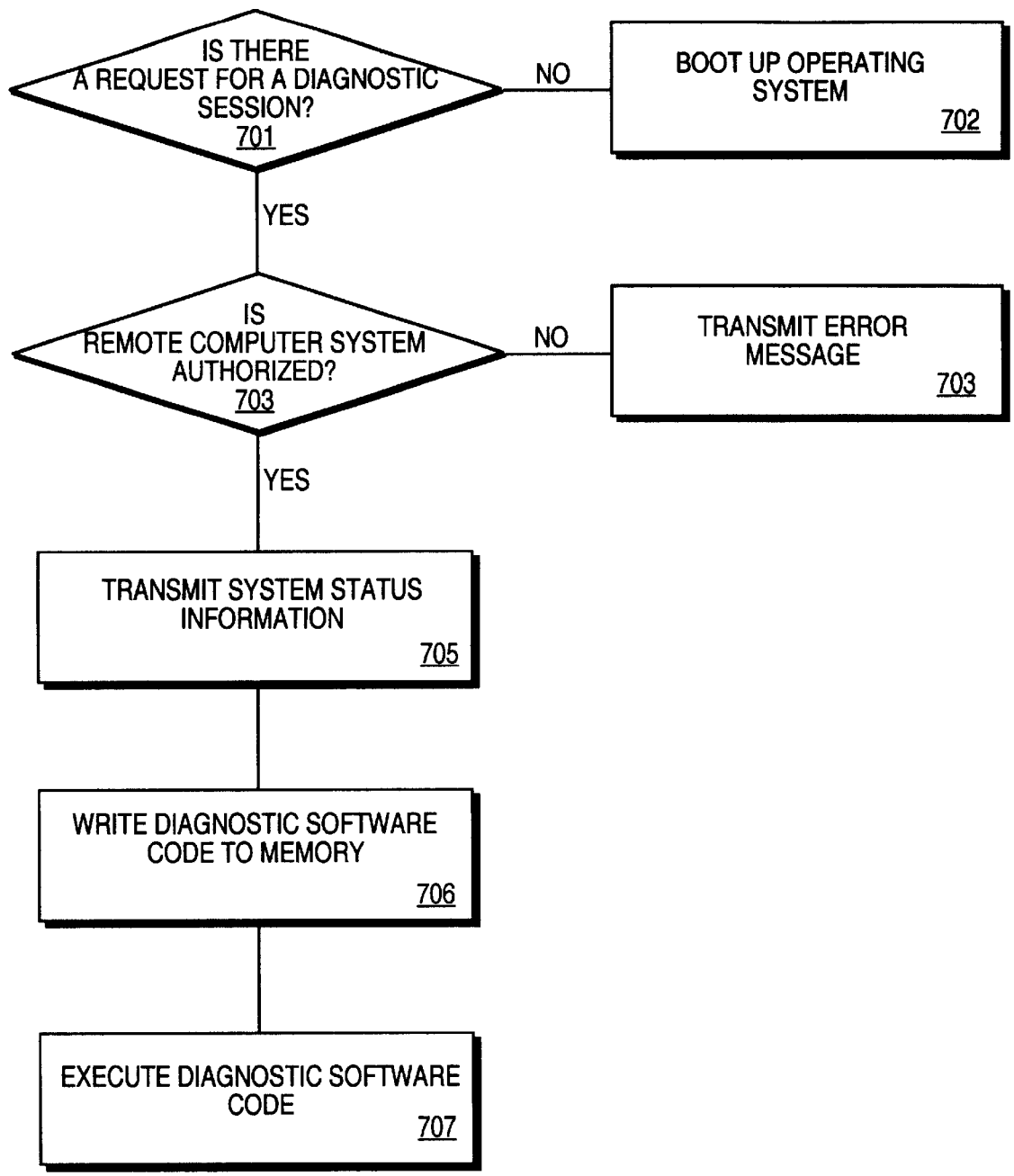
FIG. 7 is a flow chart illustrating a method for managing a computer system according to a second embodiment of the present invention.

FIG. 7 is a flow chart illustrating a method for managing a computer system according to a second embodiment of the present invention. At step 701, it is determined whether a remote computer system is requesting a diagnostic session. If the remote computer system is not requesting a diagnostic session, control proceeds to step 702. If the remote computer system is requesting a diagnostic session, control proceeds to step 703. According to an embodiment of the present invention, determining whether a remote computer system is requesting a diagnostic session is achieved by transmitting a query message to the remote computer system via a communications interface, and monitoring the communications interface for a diagnostic session request message from the remote computer system.

At step 702, the operating system is booted up.

At step 703, it is determined whether the remote computer system is authorized to participate in the diagnostic session. If the remote computer system is not authorized to participate in the diagnostic session, control proceeds to step 704. If the remote computer system is authorized to participate in the diagnostic session, control proceeds to step 705.

At step 704, a error message is transmitted to the remote computer system.

At step 705, system status information is transmitted to the remote computer system. The system status information may include a BIOS version number, an initialization report, or other information. The system status information may be used by the remote computer system to determine the types of diagnostics to perform on the computer system.

At step 706, diagnostic software code received from the remote computer system is written into locations in memory as specified by the remote computer system.

At step 707, the diagnostic software is executed.

In the foregoing description, the invention is described with reference to specific exemplary embodiments thereof. It will, however, be evident that various modifications and changes may be made thereto without departing from the broader spirit and scope of the present invention as set forth in the appended claims. The specification and drawings are to be regarded in an illustrative rather than a restrictive sense.

What is claimed is:

1. A method for managing a computer system, comprising:
    initiating a reset of the computer system from a remote location; and running diagnostic software on the computer system downloaded from the remote location, said diagnostic software being enabled to diagnose said computer system without using an operating system stored within said computer system.

2. The method of claim 1, wherein initiating the reset of the computer system from the remote location, comprises:
    interfacing the computer system via a remote connection; and
    sending a request to a shut down agent in the computer system via the remote connection.

3. The method of claim 2, wherein interfacing the computer system via a remote connection, comprises interfacing the computer system via an Ethernet connection to a management module connected to the computer system.

4. The method of claim 2, wherein interfacing the computer system via a remote connection, comprises interfacing the computer system via a modem connection to a management module connected to the computer system.

5. The method of claim 2, wherein interfacing the computer system via a remote connection, comprises interfacing the computer system via a serial connection to a serial interface connected to the computer system.

6. The method of claim 2, wherein interfacing the computer system via a remote connection, comprises interfacing the computer system via a modem connection to a serial interface connected to the computer system.

7. The method of claim 1, further comprising the step of interrogating the computer system to determine types of diagnostic software to download onto the computer system.

8. The method of claim 3, wherein interrogating the computer system comprises retrieving BIOS information from the computer system.

9. The method of claim 1, further comprising the step of downloading diagnostic software onto the computer system.

10. The method of claim 5, wherein downloading diagnostic software onto the computer system comprises transmitting data that includes diagnostic software code and a location in memory to write the diagnostic software code to a communications driver in the computer system.

11. A method for managing a computer system, comprising:
    determining whether a remote computer system is requesting a diagnostic session;
    writing diagnostic software code received from the remote computer system into locations in memory as specified by the remote computer system; and
    executing the diagnostic software on a computer system to be diagnosed without using an operating system stored within said computer system to be diagnosed.

12. The method of claim 11, wherein determining whether a remote computer system is requesting a diagnostic session, comprises:
    transmitting a query message to the remote computer system via a communications interface; and
    monitoring the communications interface for a diagnostic session request message from the remote computer system.

13. The method of claim 11, further comprising determining whether the remote computer system is authorized to participate in the diagnostic session.

14. A computer-readable medium having a sequence of instructions stored thereon, the sequence of instructions, when executed by a processor, causes the processor to:
    determining whether a remote computer system is requesting a diagnostic session;
    writing diagnostic code received from the remote computer system into locations in memory as specified by the remote computer system; and
    executing the diagnostic software on a computer system to be diagnosed without using an operating system stored within said computer system to be diagnosed.

15. The computer-readable medium of claim 14, wherein determining whether a remote computer system is requesting a diagnostic session, comprises:
    transmitting a query message to the remote computer system via a communications interface; and monitoring the communications interface for a diagnostic session request message from the remote computer system.

16. The computer-readable medium of claim 14, further comprising instructions which when executed by the processor causes the processor to determine whether the remote computer system is authorized to participate in a diagnostic session.

17. The computer-readable medium of claim 14, wherein the computer-readable medium is a read only memory and the sequences of instructions are in a Basic Input Output System (BIOS) of a computer system.

18. An apparatus, comprising:
- a shutdown agent that resets a computer system in response to receiving a shut down request from a remote computer system;
- a session manager that determines whether the remote computer system is requesting a diagnostic session; and
- a data handler that writes diagnostic software code received from the remote computer system into locations in memory as specified by the remote computer system, said diagnostic software being enabled to be executed without using an operating system stored within said computer system.

19. The apparatus of claim 18, further comprising a session authorizer that determines whether the remote computer system is authorized to request the diagnostic session.

20. The apparatus of claim 18, further comprising a system status provider that provides the remote computer system with information to determine types of diagnostic software to download to the computer system.

21. A computer system, comprising:
- a bus;
- a memory coupled to the bus;
- a diagnostic manager, coupled to the bus, that includes a shut down agent that resets a computer system in response to receiving a shut down request from a remote computer system, a session manager that determines whether the remote computer system is requesting a diagnostic session, and a data handler that writes diagnostic software code received from the remote computer system into locations in memory as specified by the remote computer system, said diagnostic software being enabled to be executed without using an operating system stored within said computer system.

* * * * *